June 24, 1969      A. F. G. HANKEN      3,452,192

MULTIPLE ENERGY DETECTION FOR MIXTURE ANALYSIS

Original Filed July 10, 1961

Inventor
Albert F. G. Hanken
By Anthony D. Cennamo
ATTORNEY

United States Patent Office 3,452,192
Patented June 24, 1969

3,452,192
MULTIPLE ENERGY DETECTION FOR MIXTURE ANALYSIS
Albert F. G. Hanken, Columbus, Ohio, assignor to Industrial Nucleonics Corporation, a corporation of Ohio
Continuation of application Ser. No. 122,794, July 10, 1961. This application Feb. 18, 1965, Ser. No. 441,946
Int. Cl. G01n 23/12; H01j 39/00
U.S. Cl. 250—43.5
12 Claims

ABSTRACT OF THE DISCLOSURE

The concentration of an element in a mixture is determined by combining measurements of radiation passed through the mixture within a first and a second wavelength band. The positions of the irradiating source member relative to a detector is adjusted to make the combined measurement insensitive to concentration changes in any other element present in the mixture.

This is a continuation of my copending application Ser. No. 122,794, filed July 10, 1961, now abandoned.

This invention relates generally to radiation gauging apparatus and specifically to a novel method and apparatus having improved energy discrimination characteristics.

In many industrial gauging applications, the use of the radiation absorption technique to determine thickness, density or composition of a product has become widespread. A radioisotope radiates the material to be measured and a detector is employed to measure the radiation transmitted or reflected by the material. These radioisotopes provide radiation having a spectral energy distribution characteristic of the radioactive element utilized. However, depending on the material and the variable being investigated, it is oftentimes desirable to measure the response of the detector in a limited band of wavelengths within the spectral distribution of the originating source.

Scintillation detectors and proportional counters provide a pulse magnitude proportional to the energy of the radiation. Linear amplifiers and pulse clipping circuitry connected to the detector output have provided the required discrimination in the past. Among the disadvantages of this system are the limited counting rate of the detector and amplifier and the tendency toward drift in the proportional counter or photomultiplier circuitry of the scintillation detector. The result has been an increase in the statistical error and a deterioration in the signal-to-noise ratio of the system.

To overcome these disadvantages, the present invention employs radiation sources and two detectors comprising ionization chambers. Filling gases of different atomic number are used in the chambers to make them individually sensitive to a predetermined energy band in the spectral distribution of the two sources. The material to be measured is inserted between the sources and chambers and the response of the two chambers is combined and evaluated.

Accordingly, it is a primary object of the present invention to provide improved energy discrimination apparatus for a radiation measuring system.

It is also an object of the present invention to provide an energy discrimination system having a signal-to-noise figure substantially greater than similar systems used heretofore.

It is yet another object of the present invention to provide a system having greater stability than similar devices used heretofore.

It is still another object of the present invention to provide a measuring system for determining the volume concentration of one of a mixture of two or more substances.

It is an additional object of the present invention to provide a measuring system which is simple to construct and operate.

It is also an object of the present invention to provide a measuring system which is not excessively difficult to calibrate or maintain in operation.

These and numerous other advantages of the present invention will become more apparent from the following description taken in conjunction with the drawings, in which.

Figure 1:
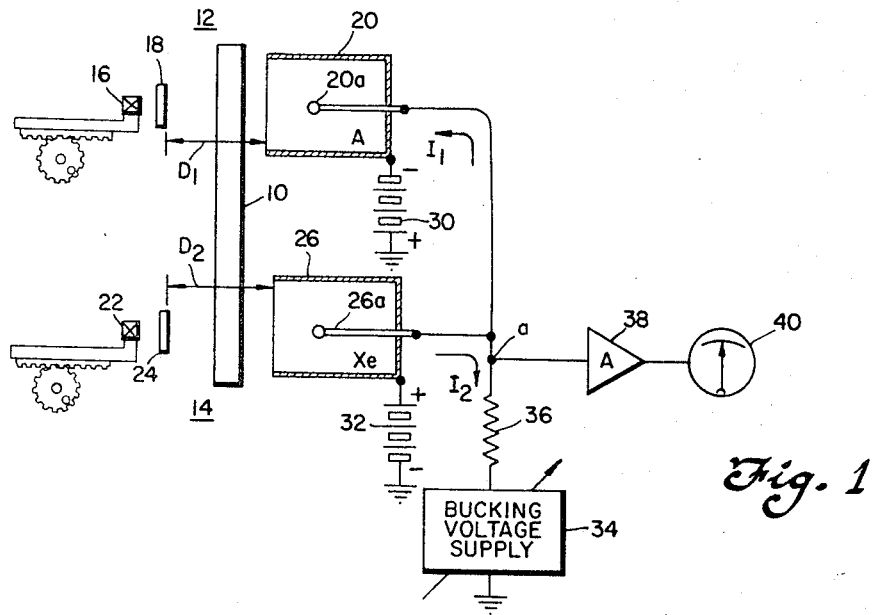
FIG. 1 is a diagrammatic view of a mixture analyzing device constructed in accordance with the present invention.

Referring to the drawings and specifically to FIG. 1, there is shown apparatus for measuring the respective concentrations of one of two substances dissolved in a solvent. The solution is confined in a measuring cell 10 located between a pair of source-detector units 12 and 14. In an industrial application the measuring cell 10 may comprise a pipe or conduit of known cross-sectional area. Or, instead of a solution it may be desirable to analyze a three-component mixture such as a chemically treated plastic sheet, in which case it is necessary that the thickness of the sheet be known or else maintained constant.

According to the invention the source-detector unit 12 includes a source of bremsstrahlung radiation provided by a beta-generating isotope such as strontium 90 and target material 18 such as aluminum and an ionization chamber 20 filled with a gas of high atomic number Z such as argon. Source-detector unit 14 includes a similar beta source 22, target 24 and ionization chamber 26; however, a different filling gas such as xenon is used in chamber 26. The two sources and targets are preferably of identical activity, composition and thickness respectively. Instead of using bremsstrahlung sources, alpha, beta, or X-ray sources may be used, in which case the chambers are made responsive to the particular type of radiation by well-known techniques.

Operating potentials for the two chambers are provided by power supplies represented by batteries 30 and 32 connected to the outer shells of the chambers in the manner shown. The chamber probes 20a and 26a are connected together. A bucking voltage supply 34 is connected through a resistor 36 to the common probe junction a. An amplifier 38 amplifies the potential at the probe junction and a meter 40 registers an indication of the amplifier potential. Since the chambers 20, 26 are oppositely polarized, the chamber currents $I_1$ and $I_2$ through resistor 36 tend to cancel. By adjusting the potential of the bucking voltage supply 34, the potential at point a with respect to ground can be made substantially zero.

Figure 2:
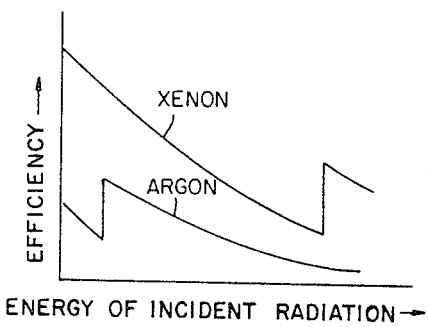
FIG. 2 is a graph of ionization chamber efficiently vs. energy of the incident radiation for chambers filled with different gases.

Referring now to FIG. 2, it is seen that the sensitivity of the chambers is different for different energies of the incident radiation. If the incident photon energies are slightly higher than the K-electron energies of the filling gas, the K-electrons will be ejected from their orbit about the nucleus; however, if the photon energy is somewhat lower, the K-electrons remain in their orbit. Therefore, the absorption coefficient for the gas will be discontinuous in an interval of photon energies including the K-edge energy. The K-edge energy for argon is 3.2 kev. while that for xenon is 34.6 kev. Since the efficiency of detection is proportional to the mass absorption coefficient $\mu$ of the filling gas, the ordinate of the graph may be so labeled.

A solution of 3% cadmium sulfate $Cd(SO_4)$ and 7% ferric sulfate $Fe_2(SO_4)_3$ in water was examined. The bremsstrahlung spectrum modified by the absorption occurring in the measuring cell 10 exhibited a maximum intensiy in the range of 25 to 50 kev. The average energy measured by the argon chamber was 80 kev. The average energy measured by the xenon chamber was 40 kev. These results permitted the construction of a system to measure the concentration of the two salts.

To calibrate the system, a standard solution of $k_1$ grams of $CdSO_4$ and $k_2$ grams of $Fe_2(SO_4)_3$ is made up and placed in the measuring cell 10. The bucking supply 34 is adjusted until the input to amplifier 38 is zero. When the cadmium salt concentration increases at a loss of both the iron and solvent concentrations (as would be the case in a fixed volume), there will be a change $\Delta I_1$ and $\Delta I_2$ in the respective chamber currents.

Figure 3A:
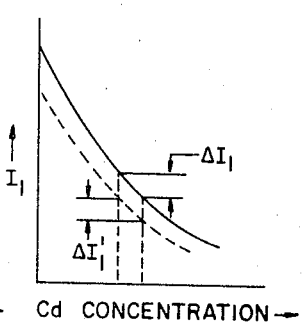
FIG. 3a is a graph of salt concentration vs. detector response for one of the ionization chambers shown in FIG. 1.
Figure 3B:
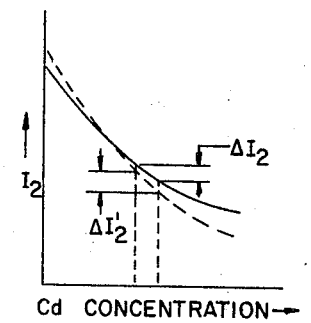
FIG. 3b is a graph of salt concentration vs. detector response for the other ionization chamber shown in FIG. 1.

Referring now to FIGS. 3a and 3b, the incremental changes in chamber current $\Delta I_1$ and $\Delta I_2$ will in general not be equal; and a potential $\Delta V = R_{36}(\Delta I_1 - \Delta I_2)$ will exist at point a; however, by adjusting the measuring gap distances $D_1$ and $D_2$ the response curves can be shifted so that $\Delta I_1 = \Delta I_2$. Therefore, the potential of point a remains zero and the system is rendered unresponsive to changes in concentration of the cadmium salt. The system would still be sensitive to concentration changes of the ferric salt because the response curves of the two chambers to changes in concentration of the iron would be different. Similarly, the system could be made unresponsive to concentration changes of the ferric compound and still be sensitive to concentration changes in the cadmium salt. In this case, a different spacing of the chambers from their associated sources must be provided. This could be accomplished by mounting each source on a slidable housing adapted for linear movement toward and away from the chamber by means of a crank and rack gear arrangement. Alternatively, the intensity of the sources may be adjusted to provide the same result.

Figure 4:
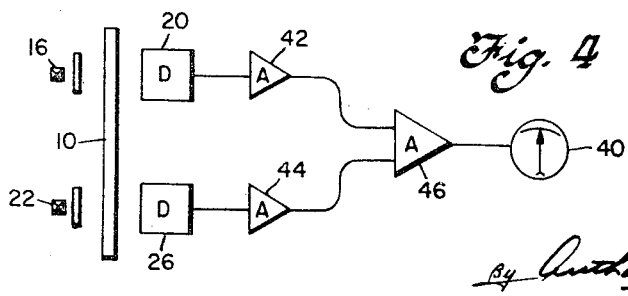
FIG. 4 is an alternate embodiment of the present invention.

An alternate method appears in FIG. 4 wherein each of the chamber outputs is amplified separately by amplifiers 42 and 44. The amplifier outputs are connected to an amplifier 46 wherein a partial electronic subtraction may be performed on the amplified signals before an indication is made on meter 40 of concentration of one or the other salt.

The invention disclosed hereinabove shows two source-detector units for determining the volume concentration of one of three components in a mixture. In general, $n-1$ source-detector units may be used to examine $n$ component mixtures.

Though the invention has been described only with reference to specific materials tested under specific conditions, it will be understood that it is applicable, with some modification, for other uses not mentioned, all of which are within the scope of the appended claims.

What is claimed is:

1. Apparatus for analyzing a multi-constituent material having variable properties, comprising means located on one side of said material for irradiating the same with a radiation having components of both high and low energy, a pair of ionization chambers located on the opposite side of said material and receiving radiation passing therethrough from said source, means adapting one of said chambers to respond primarily to a first energy range of received radiation for generating an electrical current that varies in accordance with the first function of said variable material properties, means adapting the other of said chambers to respond primarily to a second energy range of received radiation for generating a second electrical current that varies in accordance with a second function of said variable material properties, means responsive to an algebraic combination of said currents for providing a signal indicative of variations in one of said properties, and means for adjusting the relative contribution of one of said currents to said combination so as to render said signal unresponsive to variations in another of said properties.

2. Apparatus for analyzing a multi-constituent material having variable properties, comprising means located on one side of said material for irradiating the same with a radiation having components of both high and low energy, a pair of ionization chambers located on the other side of said material and receiving radiation passing therethrough from said source, one of said chambers being filled with a gas containing atoms whose K-shell is ionizable by said radiation component of low energy and the other chamber being filled with a different gas containing atoms whose K-shell is ionizable by said radiation component of high energy but not by said component of low energy whereby said chambers are adapted to pass different electrical currents which are respectively variable with the intensity of said received radiation in different energy ranges, said electrical currents varying in accordance with different functions of said variable material properties, means responsive to an algebraic combination of said currents for providing a signal indicative of variations in one of said properties, and means for adjusting the relative contribution of one of said currents to said combination so as to render said signal unresponsive to variations in another of said properties.

3. Apparatus for analyzing a multi-constitutent material having variable properties, comprising means located on one side of said material for irradiating the same with a radiation having components of both high and low energy, a pair of ionization chambers located on the opposite side of said material and receiving radiation passing therethrough from said source, means adapting one of said chambers to respond primarily to a first energy range of received radiation for generating an electrical current that varies in accordance with a first function of said variable material properties, means adapting the other of said chambers to respond primarily to a second energy range of received radiation for generating a second electrical current that is a second function of said variable material properties, a resistor means for passing said currents in opposite directions through said resistor so as to generate thereacross a voltage proportional to the difference between said currents, an adjustable source of bucking voltage, means including means for amplifying the difference between said proportional voltage and said bucking voltage for providing a signal indicating variations in one of said properties, and means independent of said material for adjusting the intensity of said radiation received by one of said chambers to render said signal independent of variations in another of said properties.

4. Apparatus for analyzing a multi-constituent material having variable properties, comprising a first radiation source located on one side of said material for passing therethrough a first beam of radiation having components of both high and low energy, a first ionization chamber located on the opposite side of said material and receiving said first radiation beam, a second radiation source located on one side of said material for passing therethrough a second beam of radiation similar to that in said first beam, a second ionization chamber located on the opposite side of said material from said second source and receiving said second beam, means adapting one of said chambers to respond primarily to a first energy range of received radiation for generating an electrical current that varies in accordance with a first function of said variable material properties, means adapting the other of said chambers to respond primarily to a second energy range of received radiation for generating a second electrical signal that varies in accordance with a second function of said variable material properties, means responsive to an algebraic combination of said currents for providing a signal indicative of variations in one of said properties, and means for adjusting the relative intensity of one of said radiation beams incident on said material so as to render said signal unresponsive to variations in another of said properties.

5. Apparatus as in claim 4 wherein each of said radiation sources comprises a source of bremsstrahlung radiation generated by the bombardment of a target by beta rays from a radioisotope.

6. Apparatus as in claim 4 wherein said relative intensity adjusting means comprises a movable mounting for one of said sources for adjusting the distance thereof from said material and one of said ionization chambers.

7. The method of analyzing a multi-constituent material having variable properties, comprising the steps of:
    irradiating said material with radiation having a relative wide energy range,
    detecting the intensity of radiation transmitted through said material within a first energy range of radiation to derive a first signal that is a first function of said variable material properties,
    detecting the intensity of radiation transmitted through said material within a second energy range to provide a second signal that is a second function of said variable material properties,
    combining said first and said second signals to obtain an output signal indicative of one of said variable material properties, and
    altering the detected radiation providing one of said first and said second signals to render said output signal indicative of one of said variable material properties and insensitive to variations in another of said variable material properties.

8. The method of analyzing a multi-constituent material having variable properties, comprising the steps of:
    irradiating said material with radiation having a relatively wide energy range,
    detecting the intensity of radiation transmitted through said material within a first energy range of radiation to provide a first signal that is a first function of said variable material properties,
    detecting the intensity of radiation transmitted through said material within a second energy range different from said first energy range to provide a second signal that is a second function of said variable material properties,
    both of said first and second energy ranges being within said wide energy range, combining said first and said second signals to obtain an output signal, and
    altering the detected radiation providing one of said first and said second signals to render said output signal indicative of one of said variable material properties and insensitive to variations in another of said variable material properties.

9. The method of analyzing a multi-constituent material having variable properties comprising the steps of:
    irradiating said material with radiation having a relatively wide and continuous range of energy,
    detecting the intensity of radiation transmitted through said material within a first energy range of radiation to provide a first signal that is a first function of said variable material properties,
    detecting the intensity of radiation transmitted through said material within a second energy range of radiation to provide a second signal that is a second function of said variable material properties,
    said first and said second energy ranges being within said wide energy range of said irradiating radiation,
    combining said first and second signals to obtain an output signal,
    altering the intensity of said radiation transmitted by said material to render said output signal indicative of one of said variable material properties and insensitive to variations in another of said variable material properties, and
    indicating a value for said one material property in accordance with said output signal.

10. The method as set forth in claim 9 wherein said material irradiating step comprises:
    directing two beams of radiation from one or more sources into said material to be measured,
    said detection in said first energy range being provided by a first ionization chamber and said detection in said second energy range is provided by a second ionization chamber, and wherein
    said radiation intensity reaching one of said chambers is altered by changing the source-chamber spacing for said one chamber.

11. The method of analyzing a mixture of three elements for their relative concentration in a known sample volume, comprising the steps of:
    irradiating said volume with bremsstrahlung radiation having a wide energy spectrum from two sources,
    detecting the intensity of radiation transmitted through said mixture from one of said sources within a first energy range of radiation with a first ionization chamber to provide a first signal that is a first function of said concentration of each of said elements,
    detecting the intensity of radiation transmitted through said mixture from the other of said sources within a second energy range of radiation with a second ionization chamber to provide a second signal that is a second function of said concentration of each of said elements,
    said first and second energy ranges being within said wide bremsstrahlung spectrum,
    subtracting one of said signals from the other to provide an output signal representative of the concentration of one of said elements, and
    altering the intensity of said irradiating bremsstrahlung radiation reaching one of said chambers by changing the source location to render said output signal insensitive to variations in the concentration of another of said elements, and
    indicating a value for said representative concentration in accordance with said output signal.

12. The method of analyzing a multi-constituent material having variable properties, comprising the steps of:
    irradiating said material with radiation having a relative wide energy range,
    detecting the intensity of radiation transmitted through said material within a first energy range of radiation to derive a first signal that is a first function of said variable material properties,
    detecting the intensity of radiation transmitted through said material within at least one other energy range to provide at least a second signal that is a second function of said variable material properties, combining at least said first and said second signals to obtain an output signal indicative of one of said variable material properties, and altering the detected radiation providing one of said first and said second signals to render said output signal indicative of one of said variable material properties and insensitive to variations in another of said variable material properties.

References Cited

UNITED STATES PATENTS

| | | | |
|---|---|---|---|
| 2,884,535 | 4/1959 | Swift | 250—83.3 |
| 2,922,888 | 1/1960 | Faulkner et al. | 250—83.3 |
| 2,937,275 | 5/1960 | Thourson et al. | 250—43.5 |
| 2,966,587 | 12/1960 | Faulkner et al. | 250—43.5 |

ARCHIE R. BORCHELT, *Primary Examiner.*

U.S. Cl. X.R.

250—83.3, 83.6